G. F. NILSSON.
LAWN SPRINKLER.
APPLICATION FILED SEPT. 7, 1909.
986,201.
Patented Mar. 7, 1911.
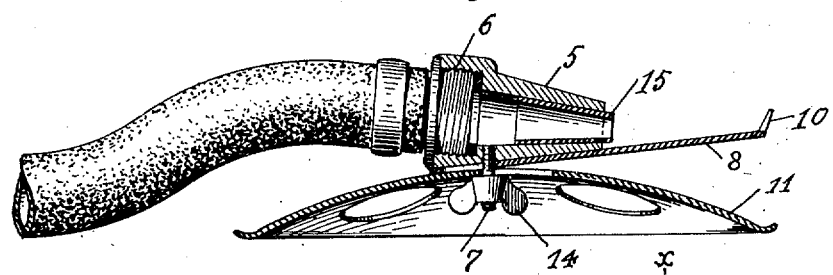
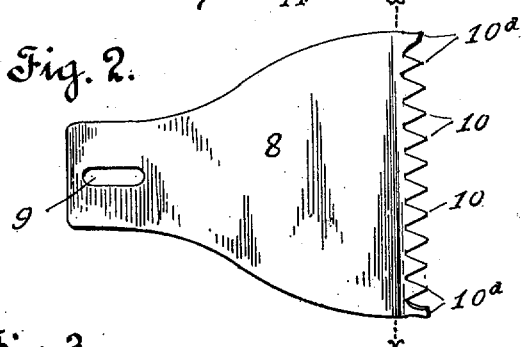
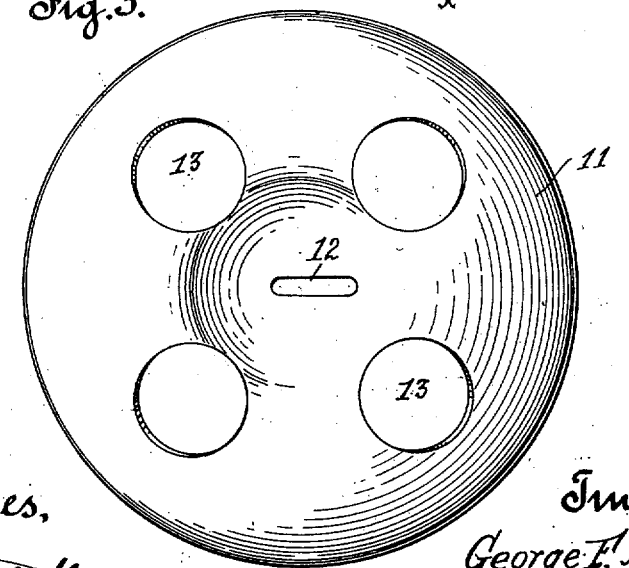
Witnesses,
Inventor,
George F. Nilsson,
By Upham
Attorney.

UNITED STATES PATENT OFFICE.

GEORGE F. NILSSON, OF PASADENA, CALIFORNIA.

LAWN-SPRINKLER.

986,201.  Specification of Letters Patent.  Patented Mar. 7, 1911.

Application filed September 7, 1909. Serial No. 516,606.

*To all whom it may concern:*

Be it known that I, GEORGE F. NILSSON, a citizen of the United States, residing in the city of Pasadena, county of Los Angeles, and State of California, have invented new and useful Improvements in Lawn-Sprinklers, of which the following is a specification.

My invention relates to a sprinkler to be attached upon the end of a hose, and the object thereof is to provide a sprinkler nozzle provided with an adjustable spray blade, which may be used to throw a solid stream, or which can be quickly changed by throwing the spray blade in front of the solid stream to cause the same to scatter into spray which will be coarser or finer as the spray blade projects at a lesser or greater distance beyond the end of the nozzle.

A further object is to provide a set of teeth on one side of the blade which will project at an angle to the plane of the blade, whereby so much of the water as may strike the teeth will be deflected at a different angle from the other part of the water not striking the teeth.

A further object is to provide a base, which preferably has a curved outer surface and is provided with a slot terminating at approximately the upper central portion of the base which may be adjustably connected to the nozzle and blade that the angle of inclination of the spray blade to the base support may be shifted so as to throw the water off the blade either upwardly or downwardly at an angle to the surface of the ground or parallel to the surface of the ground when the water leaves the spray blade.

I accomplish these objects by the sprinkler described herein, and illustrated in the accompanying drawings, in which;

Figure 1 is a longitudinal central section of my improved lawn sprinkler. Fig. 2 is a plan of the spray blade. Fig. 3 is a plan of the base to which the nozzle is adjustably secured when in use.

In the drawings 5 is the tapering body of the nozzle which is provided with a screw threaded socket 6 for attachment to the hose. Near the central portion of the bottom of the nozzle is secured the threaded bolt 7 which is preferably secured to the body at the time the same is cast.

8 is the spray blade which is provided with an elongated aperture or slot 9 in the shank thereof.

10 are teeth which extend across the front end of the spray blade and project from one side thereof. The two outer teeth $10^a$ on each side of the spray blade are preferably turned with the faces thereof at an angle to the plane of the faces of the other teeth so as to throw the water striking the same, not only upwardly, but also outwardly. The angle of the teeth to the plane of the blade will be governed by the height to which it is desired to throw the water that strikes the teeth, the greater the angle of inclination the higher the water will be thrown. If it is not desired to have the blade provided with teeth, the outer end may be cut off on the line $x$—$x$ of Fig. 2. By turning the blade over the teeth will not interfere with the delivery of the water.

11 is the sprinkler base which is provided with an elongated slot or aperture 12 extending from near the center thereof toward one of the edges, the direction is immaterial. I provide the base with apertures 13 to lighten the same. The base is preferably a segment of a hollow sphere with the edges upturned and pressed out of sheet metal.

In assembling the parts the spray blade would be placed upon the body with the bolt 7 projecting through aperture 9 in the blade. The base would then be placed upon the spray blade with the bolt 7 projecting through aperture 12 in the base. Wing nut 14 would then be screwed upon bolt 7 to hold the parts firmly together. The slot in the base is so constructed that when bolt 7 engages the lowest part thereof, the nozzle will have the position to throw the water to its highest elevation when it strikes the spray blade, and when bolt 7 engages the highest part thereof, nozzle will have the position to throw the water on a plane parallel with the surface of the lawn. By reversing the position of the nozzle when the bolt is in the lowest portion of the slot the water will be thrown to a point very close to the nozzle if the same is on level ground. This is particularly desirable, because where the lawn is sloping the sprinkler can be thus turned to throw the water down the slope. By shifting the spray blade on bolt 7 so that the blade will project to a greater or less extent in front of the nozzle a finer or less fine spray can be produced. To vary the quantity of water delivered through the nozzle I provide a tapered hollow reducer 15 which can be placed within the body as shown in Fig. 1. This can be quickly removed when a larger volume of water is required than can be delivered through the reducer. It will be observed that by taking off the wing nut the spray blade can be turned over so that the teeth will be on the lower side and not interfere with the delivery of the spray. It will be observed that the spray blade can be shifted so as to deliver the water from the nozzle on either side of the blade or at any intermediate point between the sides, or be turned so as not to affect the water delivered from the nozzle. By delivering the water from the nozzle close to the edge of the spray blade, the width of the spray is very much reduced.

Having described my invention what I claim is;

1. A lawn sprinkler comprising a tapered body having a tapered aperture therethrough; a bolt secured to said body; a wing nut upon said bolt; a flat spray blade having an elongated aperture in one end thereof, and having teeth at the other end thereof, said teeth projecting at an angle to the plane of the blade on one side thereof, said blade being adapted to be secured to the nozzle by means of said bolt and nut and to be adjusted longitudinally upon said nozzle or to be turned clear of the water thrown from the nozzle.

2. A lawn sprinkler comprising a nozzle having an aperture therethrough; a flat spray blade having a longitudinal aperture in one end thereof; a base having the outer surface thereof curved; a longitudinal aperture in said base extending from near the center toward one edge thereof; a bolt secured to said nozzle and adapted to pass through the apertures in said blade and base; and a nut adapted to be screwed upon said bolt to secure said parts together.

3. A lawn sprinkler base having the outer surface curved and an aperture extending from near the center thereof toward one edge thereof; in combination with a sprinkler nozzle having means secured thereto to pass through said aperture and adjustably secure the nozzle upon the base.

4. A lawn sprinkler comprising a flat spray blade having teeth projecting from one side thereof at an angle from the plane of the blade at one end and a longitudinal elongated slot in the shank thereof, in combination with a nozzle having means to adjustably secure said blade to said nozzle with the end of the blade projecting in front of, or at either side of the aperture through the body.

5. A lawn sprinkler comprising a flat spray blade having a longitudinal elongated slot near one end thereof; a base plate having the outer surface thereof curved and provided with an elongated slot extending from near the center thereof toward one edge; and a nozzle having means to adjustably secure said parts together.

In witness that I claim the foregoing I have hereunto subscribed my name this 26th day of August, 1909.

GEORGE F. NILSSON.

Witnesses:
   G. E. HARPHAM,
   S. B. AUSTIN.

---

Copies of this patent may be obtained for five cents each, by addressing the "Commissioner of Patents, Washington, D. C."